(12) United States Patent
Zhang et al.

(10) Patent No.: US 7,985,339 B2
(45) Date of Patent: Jul. 26, 2011

(54) POLYARYLETHER COMPOSITIONS BEARING ZWITTERION FUNCTIONALITIES

(75) Inventors: Yanshi Zhang, Shaker Heights, OH (US); Gary William Yeager, Rexford, NY (US); Hongyi Zhou, Niskayuna, NY (US); Daniel Steiger, Bedminster, NJ (US)

(73) Assignee: General Electric Company, Niskayuna, NY (US)

(*) Notice: Subject to any disclaimer, the term of this patent is extended or adjusted under 35 U.S.C. 154(b) by 352 days.

(21) Appl. No.: 12/197,374

(22) Filed: Aug. 25, 2008

(65) Prior Publication Data

US 2010/0044314 A1  Feb. 25, 2010

(51) Int. Cl.
*B01D 11/00* (2006.01)
*B01D 61/00* (2006.01)
*B01D 39/00* (2006.01)
*B01D 39/14* (2006.01)

(52) U.S. Cl. .......... 210/645; 210/651; 210/500.27; 210/500.41; 210/500.37; 264/49; 428/308.4

(58) Field of Classification Search .......... 210/500.27, 210/500.41, 645, 651–652, 500.37, 646; 428/308.4; 264/49; 525/534
See application file for complete search history.

(56) References Cited

U.S. PATENT DOCUMENTS

| | | | |
|---|---|---|---|
| 4,087,388 A * | 5/1978 | Jensen et al. ............ 521/61 |
| 4,874,522 A | 10/1989 | Okamoto et al. | |
| 5,080,698 A | 1/1992 | Krizan | |
| 5,149,581 A | 9/1992 | Matsuo et al. | |
| 5,202,023 A | 4/1993 | Trimmer et al. | |
| 5,232,601 A | 8/1993 | Chu et al. | |
| 5,543,465 A | 8/1996 | Bell et al. | |
| 5,762,798 A * | 6/1998 | Wenthold et al. ........ 210/500.23 |
| 5,807,944 A | 9/1998 | Hirt et al. | |
| 5,879,554 A | 3/1999 | Loffelmann et al. | |
| 6,103,117 A | 8/2000 | Shimagaki et al. | |
| 6,214,382 B1 | 4/2001 | Eguchi et al. | |
| 6,432,309 B1 | 8/2002 | Fuke et al. | |
| 6,514,409 B2 | 2/2003 | Kakiuchi et al. | |
| 7,094,349 B2 * | 8/2006 | Inoue et al. ............ 210/500.27 |
| 7,462,223 B2 * | 12/2008 | Kiefer et al. ............ 96/4 |
| 2002/0103366 A1 | 8/2002 | Bellon et al. | |
| 2002/0147282 A1 | 10/2002 | Mayes et al. | |
| 2004/0026314 A1 | 2/2004 | Kobayashi et al. | |
| 2005/0037132 A1 | 2/2005 | Horres et al. | |
| 2005/0064038 A1 | 3/2005 | Dinh et al. | |
| 2006/0139044 A1 | 6/2006 | Park et al. | |
| 2006/0264355 A1 | 11/2006 | Storr et al. | |

FOREIGN PATENT DOCUMENTS

| | | |
|---|---|---|
| EP | 1424124 B1 | 4/2009 |
| FR | 2187516 A1 | 1/1974 |
| JP | 04050135 A2 | 2/1992 |
| JP | 07207526 A2 | 8/1995 |
| JP | 2002030125 A | 1/2002 |
| JP | 2003320229 A | 11/2003 |
| WO | WO9414897 | 7/1994 |
| WO | WO2008073536 A1 | 6/2008 |

OTHER PUBLICATIONS

PCT International Search Report dated Dec. 2, 2009.
Lowe et al., "Synthesis and Solution Properties of Zwitterionic Polymers", Chem. Rev., vol. 102, pp. 4177-4189, 2002.
Anton et al., "Solubilization by Polysoaps", Colloid & Polymer Science, vol. 272, pp. 1118-1128, 1994.
Soto et al., "Poly(sulphopropylbetaines): 1. Synthesis and Characterization", Polymer, vol. 25, pp. 121-128, Jan. 1984.
Köeberle et al., "Self-Organization of Hydrophobized Polyzwitterions", Polymer, vol. 33, No. 19, pp. 4029-4039, 1992.
Köeberle et al., "Hydrophobically Modified Zwitterionic Polymers: Synthesis, Bulk Properties, and Miscibility With Inorganic Salts", Macromolecules, vol. 27, pp. 2165-2173, 1994.
Higuchi, Akon., Chemically Modified Polysulfone Hollow Fibers with Vinylprrolidone Having Improved Blood Compatibility, Biomaterials 23 (2002), pp. 2659-2666.
Higuchi, Akon, "Serum Protein Adsorption and Platelet Adhesion on Aspartic-acid-immobilized Polysulfone Membranes", J. of Biomaterials Science, Polymer Edition, (2004) 15(8), pp. 1051-1063.
Higuchi, Akon, "Chemically Modified Polysulfone Hollow Fibers with Zwitterionic Sulfoalkylbetaine Group Having Improved Blood Compatibility", ACS Symposium Series (2004), American Chemical Society, pp. 366-382.
Grant, H. et al., "The Viability and Function of Primary Rat Hepatocytes Cultured on Polymeric Membranes Developed for Hybrid Artificial Liver Devices", Part A, vol. 73, N3, Jun. 1, 2005, pp. 367-375.
U.S. Appl. No. 11/567,487, filed Dec. 6, 2006 entitled "Polyarylethernitrile Hollow Fiber Membranes" (192172-1).
U.S. Appl. No. 11/611,691, filed Dec. 15, 2006 entitled "Polyarylether Membranes" (192172-2).
U.S. Appl. No. 11/611,697, filed Dec. 15, 2006 entitled "Polyarylether Membranes" (192172-3).

* cited by examiner

*Primary Examiner* — Ana M Fortuna
(74) *Attorney, Agent, or Firm* — Eileen W. Gallagher

(57) ABSTRACT

A method for making a polysulfone having zwitterionic functionality comprising reacting a piperazine amine functionalized polysulfone with sultone is described as are blends with other polymers. Membranes containing polysulfones having zwitterionic functionality are also provided. Membranes thus formed are used in hemodialysis, hemofiltration, and water purification.

9 Claims, No Drawings

POLYARYLETHER COMPOSITIONS BEARING ZWITTERION FUNCTIONALITIES

BACKGROUND OF THE INVENTION

Liquid filtration membranes for blood purification and separation of biological products may be in hollow fiber or flat sheet configurations and have good biocompatibility and hemocompatibility. Polysulfones, a class of engineering thermoplastic, have been widely used in membranes for hemodialysis and protein separations. Polysulfones have high glass transition temperature, good mechanical strength, and excellent chemical resistance, rendering them ideal materials for membrane applications. Despite these benefits, the hydrophobic nature of polysulfones made them less ideal in these aqueous applications such as hemodialysis and protein separation. The hydrophobicity often results in fouling when applied to biological materials, resulting in reduced efficiency due to flux decline, high cleaning and maintenance costs and low membrane lifetimes.

As a result, a blend of polysulfones together with a hydrophilizing agent, for example polyvinylpyrrolidone (PVP), may be used to achieve better biocompatibility and hydrophilicity. However, PVP is water-soluble and is slowly leached from the porous polymer matrix creating product variability. Thus, hydrophilic porous membranes possessing excellent thermal, mechanical properties and improved fouling resistance are desired for longer service lifetimes.

BRIEF SUMMARY OF THE INVENTION

The present invention affords polysulfones with enhanced hydrophilicity and biocompatibility by functionalization (of the polysulfones) with a tertiary amine, which is then further functionalized to afford a corresponding zwitterionic material. Zwitterionic materials are highly hydrophilic and charge neutral.

In one embodiment, a method for making a polysulfone having zwitterionic functionality comprising reacting a piperazine amine functionalized polysulfone with sultone is described.

In another embodiment, a blend comprising a polysulfone having zwitterionic functionality and one or more resins is described, the polysulfone having zwitterionic functionality comprises units from at least one of structure VI or structure VII:

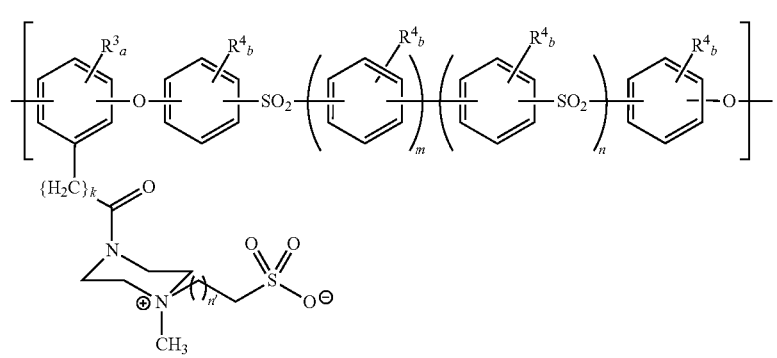

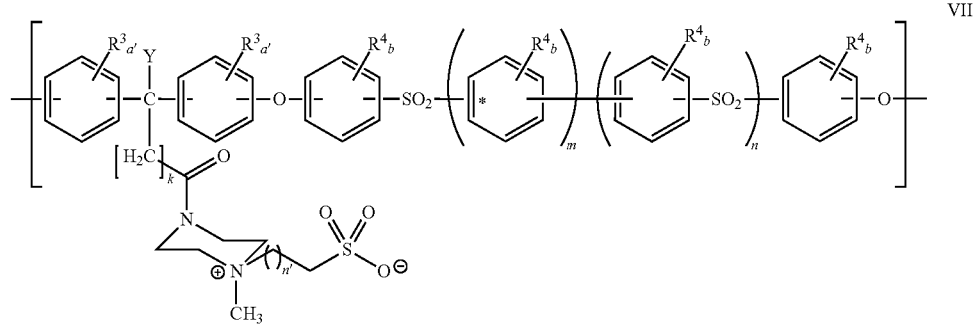

wherein $R^3$ and $R^4$ are each, independently at each occurrence, hydrogen, $C_1$-$C_{12}$ alkyl, $C_3$-$C_{30}$ aryl or a combination thereof; k is from 0 to about 10; Y is hydrogen, $C_1$-$C_{20}$ alkyl or $C_3$-$C_{30}$ aryl; a is 1 to 3; a' is 1 to 4; b is 1 to 4; m and n are each, independently, 0 or 1; and n' is 0 to 6.

In another embodiment, a method for making a blend comprises mixing a polysulfone having zwitterionic functionality and one or more resins is described wherein a polysulfone having zwitterionic functionality comprises units from at least one of structure VI or structure VII.

In another embodiment membranes of polysulfone resins or blends membrane comprising a polysulfone having zwitterionic functionality are described. In yet another embodiment membranes thus formed are used in hemodialysis, hemofiltration, and water purification.

DETAILED DESCRIPTION

Zwitterions have long been considered as promising in their ability to enhance the biocompatibility and hydrophilicity of materials since many cell-surfaces are made from phospholipids, which are zwitterionic in nature. A zwitterion is a dipolar ion that is carries both a positive and negative charge simultaneously. Surfaces modified with zwitterionic species may have improved biocompatibility.

Biocompatible zwitterionic materials may be made from piperazine amide containing monomers, which have higher hydrophilicity than bisphenol A. The piperazine amide containing monomers may be incorporated into polysulfone backbones to form functionalized polysulfones with enhanced hydrophilicity and biocompatibility. Further functionalization of these piperazine amide functionalities can lead to zwitterionic materials, which are highly hydrophilic and charge neutral.

In one embodiment the process for preparing a polysulfone having zwitterionic functionally is provided. The process as shown in Scheme 1 includes the reaction of a piperazine amine containing polysulfone with a sultone at elevated temperatures and wherein n is about 100 to 800 and n' is 0 to 6.

Scheme 1: Synthesis of zwitterion containing polysulfones

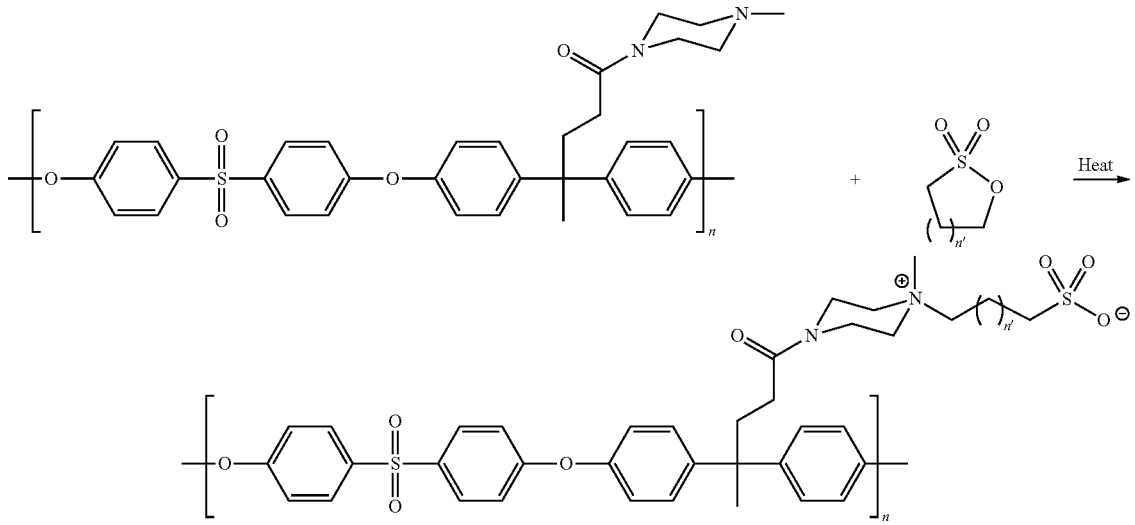

In one embodiment, the piperazine amine containing polysulfones used as a precursor to a zwitterions containing polysulfone comprises units from at least one of structure I or structure II:

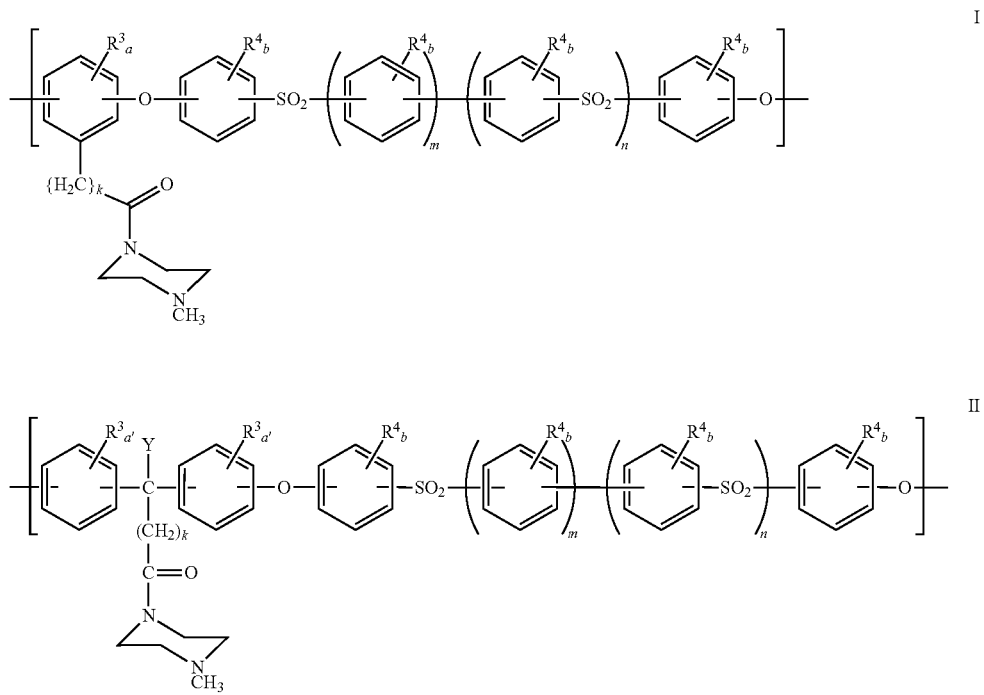

wherein $R^3$ and $R^4$ are each, independently, hydrogen, $C_1$-$C_{12}$ alkyl, $C_3$-$C_{30}$ aryl or a combination thereof;

Y is hydrogen, $C_1$-$C_{20}$ alkyl or $C_3$-$C_{30}$ aryl;

k is 0 to about 10;

a is 1 to 3;

a' is 1 to 4;

b is 1 to 4; and m and n are each, independently, 0 or 1.

In one embodiment, k is in a range of from about 0 to about 5. In another embodiment, k is in a range of from about 1 to about 3.

In one embodiment, Y may be methyl, ethyl, propyl, isopropyl, butyl, hexyl, heptyl, octyl, 4-methylpent-1-yl, phenyl, naphthyl or biphenyl.

In one embodiment, a, a' or b may be 0. In another embodiment, a, a' and b are 0.

In one embodiment, $R^3$ and $R^4$ are hydrogen. In another embodiment, $R^3$ and/or $R^4$ may be methyl, ethyl, propyl, isopropyl, butyl, hexyl, heptyl, octyl, 4-methylpent-1-yl, phenyl, naphthyl or biphenyl.

In one embodiment, the piperazine amine containing polysulfones comprises units from at least one of structure I or structure II is reacted with sultone in the presence of heat to form a corresponding zwitterion containing polysulfone.

In one embodiment the piperazine amine containing polysulfone used as a precursor to a zwitterion containing polysulfone comprises units of structure III:

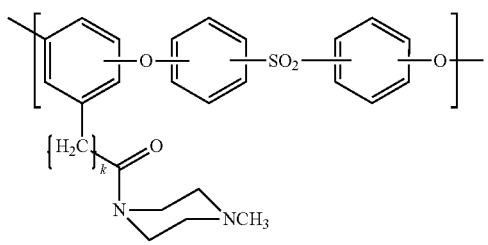

III wherein k is from 0 to about 10.

In one embodiment, k is in a range of from about 0 to about 5. In another embodiment, k is in a range of from about 1 to about 3.

In one embodiment, the piperazine amine containing polysulfones comprises units from of structure III is reacted with sultone in the presence of heat to form a corresponding zwitterion containing polysulfone.

The polysulfones containing piperazine amine functionality used as a precursor to a zwitterion containing polysulfone are hydrophilic, but are not water-soluble. They are solvent resistant polymers with a high glass transition temperature. In one embodiment, the glass transition temperature, Tg, of the polymer ranges from about 120° C. to about 280° C. In another embodiment, the polymer ranges from about 140° C. to about 250° C. In another embodiment, the Tg ranges from about 140° to about 225° C., including from about 175° C. to about 225° C.

The polysulfone having piperazine amine functionality used as a precursor to a zwitterion containing polysulfone may be characterized by number average molecular weight (Mn) and weight average molecular weight (Mw). The various average molecular weights Mn and Mw are determined by techniques, such as gel permeation chromatography, and are known to those skilled in the art. In one embodiment, the Mn of the polymer is in the range from about 10,000 g/mol to about 1,000,000 g/mol. In another embodiment, the Mn ranges from about 15,000 g/mol to about 200,000 g/mol. In another embodiment, the Mn ranges from about 20,000 g/mol to about 100,000 g/mol. In another embodiment, the Mn ranges from about 40,000 g/mol to about 80,000 g/mol. In one embodiment, the Mw of the polymer is in the range from about 10,000 g/mol to about 5,000,000 g/mol. In another embodiment, the Mw ranges from about 15,000 g/mol to about 1,000,000 g/mol. In another embodiment, the Mw ranges from about 20,000 g/mol to about 500,000 g/mol. In another embodiment, the Mn ranges from about 40,000 g/mol to about 400,000 g/mol.

In one embodiment, the polysulfone containing piperazine amine functionality used as precursors to a zwitterion containing polysulfones may be a homopolymer or a copolymer. In one embodiment, the polysulfone containing piperazine amine functionality is a homopolymer comprising units from structure I. In another embodiment, the polysulfone containing piperazine amine functionality is a homopolymer comprising units from structure II.

In another embodiment, the polysulfone containing piperazine amine functionality used as precursors to the zwitterion containing polysulfones is a copolymer. The copolymer may be random, block or graft. In one embodiment, the copolymer may be branched or hyperbranched. In one embodiment, a polysulfone copolymer having piperazine amine functionality comprises (A) units from at least one of structure I or structure II:

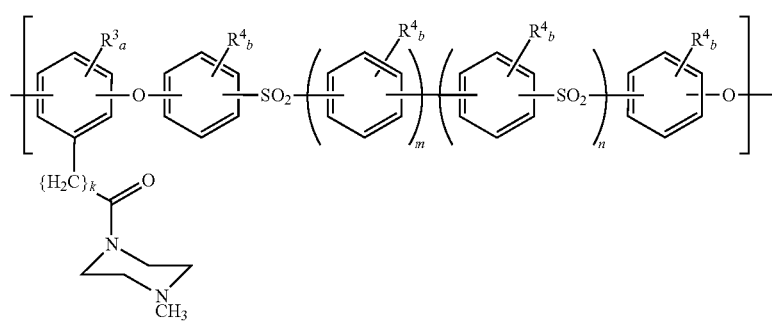

I

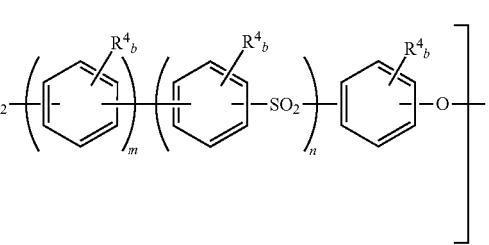

II

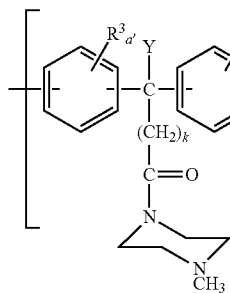

wherein $R^3$ and $R^4$ are each, independently at each occurrence, hydrogen, $C_1$-$C_{12}$ alkyl or $C_3$-$C_{30}$ aryl, or a combination thereof;

Y is hydrogen, $C_1$-$C_{20}$ alkyl or $C_3$-$C_{30}$ aryl;

k is from 0 to about 10;

a is 1 to 3;

a' is 1 to 4;

b is 1 to 4; and m and n are each, independently, 0 or 1; and (B) units from an aromatic ether.

In one embodiment, k is in a range of from 0 to about 5. In another embodiment, k is in a range of from about 1 to about 3.

In one embodiment, a, a' or b may be 0. In another embodiment, both a, a' and b are 0.

In one embodiment, $R^3$ and $R^4$ are hydrogen. In another embodiment, $R^3$ and/or $R^4$ may be methyl, ethyl, propyl, isopropyl, butyl, hexyl, heptyl, octyl, 4-methylpent-1-yl, phenyl, naphthyl or biphenyl.

In one embodiment, Y may be methyl, ethyl, propyl, isopropyl, butyl, hexyl, heptyl, octyl, 4-methylpent-1-yl, phenyl, naphthyl or biphenyl.

In one embodiment, the copolymer may comprise aromatic ether units from about 10 mole percent to about 90 mole percent. In another embodiment, the aromatic ether units are present from about 20 mole percent to about 80 mole percent. In another embodiment, the aromatic ether units are present from about 40 mole percent to about 60 mole percent. In one embodiment, the copolymer may comprise polysulfone units having piperzine amine functionality from about 10 mole percent to about 90 mole percent. In another embodiment, the polysulfone units having piperzine amine functionality are present from about 20 mole percent to about 80 mole percent. In another embodiment, the polysulfone units having piperzine amine functionality are present from about 40 mole percent to about 60 mole percent.

Polysulfone copolymers having piperazine amine functionality have a high glass transition temperature ranging from about 120° C. to about 280° C. in one embodiment, and ranging from about 140° C. to about 250° C. in another embodiment. In another embodiment, the Tg ranges from about 140° to about 225° C. and in another embodiment, the Tg ranges from about 175° C. to about 225° C.

The polysulfone copolymer having piperazine amine functionality has a molecular weight Mn in the range from about 10,000 g/mol to about 1,000,000 g/mol. In another embodiment, the Mn ranges from about 15,000 g/mol to about 200,000 g/mol. In another embodiment, the Mn ranges from about 20,000 g/mol to about 100,000 g/mol. In another embodiment, the Mn ranges from about 40,000 g/mol to about 80,000 g/mol.

In one embodiment, the Mw of the polymer may be in the range from about 10,000 g/mol to about 5,000,000 g/mol. In another embodiment, the Mw ranges from about 15,000 g/mol to about 1,000,000 g/mol. In another embodiment, the Mw ranges from about 20,000 g/mol to about 500,000 g/mol. In another embodiment, the Mn ranges from about 40,000 g/mol to about 400,000 g/mol.

The aromatic ether is any aromatic ether suitable for copolymerizing with the polysulfone having piperazine amine functionality. In one embodiment, the aromatic ether comprises units from formula IV or V:

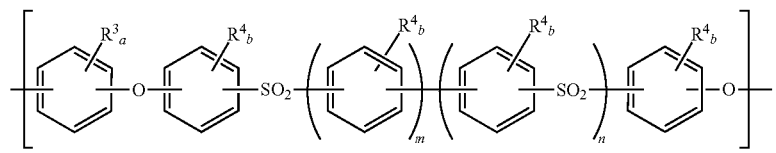

IV

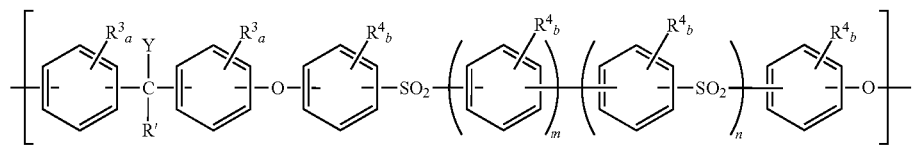

V wherein $R^3$ and $R^4$ are each, independently, hydrogen, $C_1$-$C_{12}$ alkyl, $C_3$-$C_{30}$ aryl, or a combination thereof;

Y and R' are each, independently, hydrogen, $C_1$-$C_{20}$ alkyl or $C_3$-$C_{30}$ aryl;

a is 1 to 4;

b is 1 to 4; and m and n are each, independently, 0 or 1.

In one embodiment, a or b may be 0. In another embodiment, both a and b are 0.

In one embodiment, $R^3$ and $R^4$ are hydrogen. In another embodiment, $R^3$ and/or $R^4$ may be methyl, ethyl, propyl, isopropyl, butyl, hexyl, heptyl, octyl, 4-methylpent-1-yl, phenyl, naphthyl or biphenyl.

In one embodiment, Y may be methyl, ethyl, propyl, isopropyl, butyl, hexyl, heptyl, octyl, 4-methylpent-1-yl, phenyl, naphthyl or biphenyl.

In one embodiment, R' may be methyl, ethyl, propyl, isopropyl, butyl, hexyl, heptyl, octyl, 4-methylpent-1-yl, phenyl, naphthyl or biphenyl.

In one embodiment, the polysulfone units having piperazine amine functionality and used as precursors to the zwitterionic containing polysulfones is blended with at least one resin. The selection of the resin imparts different properties to the blend, such as improved heat resistance, biocompatibility, and the like. In one embodiment, a blend comprises a polysulfone units having piperazine amine functionality and one or more resins, the polysulfone units having piperazine amine functionality comprises units from at least one of structure I or structure II:

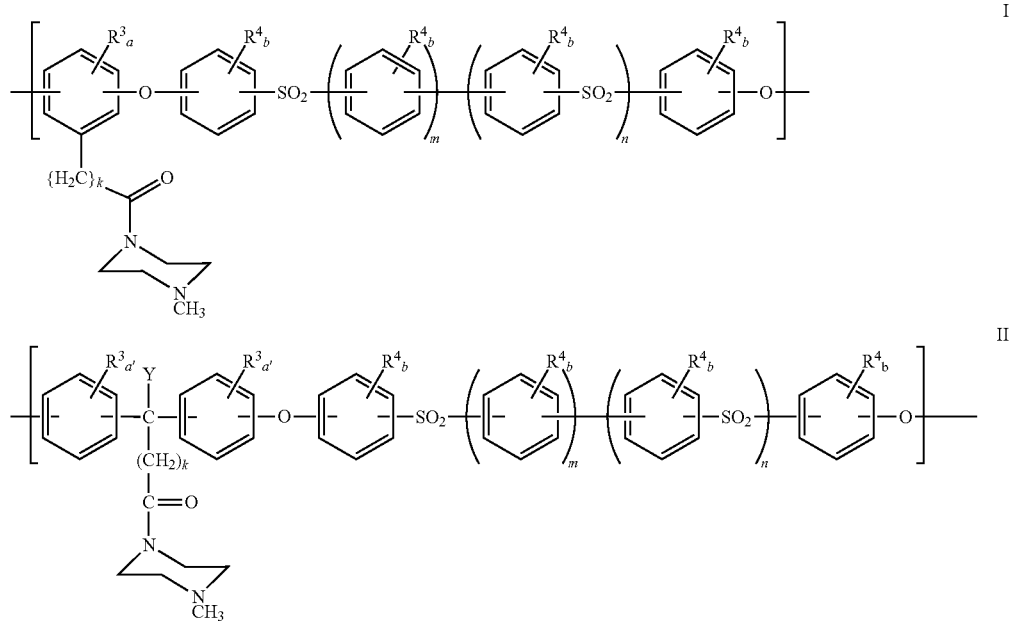

wherein $R^3$ and $R^4$ are each, independently, hydrogen, $C_1$-$C_{12}$ alkyl, $C_3$-$C_{30}$ aryl, or a combination thereof;

Y is hydrogen, $C_1$-$C_{20}$ alkyl or $C_3$-$C_{30}$ aryl;

k is 0 to about 10;

a is 1 to 3;

a' is 1 to 4;

b is 1 to 4; and m and n are each, independently, 0 or 1

In one embodiment, k is in a range from 0 to 10. In another embodiment, k is in a range from about 1 to about 3.

In one embodiment, Y may be methyl, ethyl, propyl, isopropyl, butyl, hexyl, heptyl, octyl, 4-methylpent-1-yl, phenyl, naphthyl or biphenyl.

In one embodiment, one of a, a' or b may be 0. In another embodiment, a, a' and b are 0.

In another embodiment, $R^3$ and $R^4$ are hydrogen. In another embodiment, $R^3$ and/or $R^4$ may be methyl, ethyl, propyl, isopropyl, butyl, hexyl, heptyl, octyl, 4-methylpent-1-yl, phenyl, naphthyl or biphenyl.

In one embodiment, a polysulfone copolymer having piperazine amine functionality comprises units from at least one of structure I or structure II and blended with at least one resin is reacted with sultone in the presence of heat to form a corresponding zwitterion containing polysulfone.

In one embodiment, the polysulfone units having piperazine amine functionality used as a precursor to a zwitterion containing polysulfone in the blend is a homopolymer as described above. In another embodiment, the polysulfone units having piperazine amine functionality is a copolymer as described above.

The resin may be hydrophilic or hydrophobic in nature. Examples of resins that may be blended with the polysulfone units having piperazine amine functionality include polysulfone, polyether sulfone, polyether urethane, polyphenylene sulfone, polyamide, polyether-amide, polyacrylonitrile, polyvinylpyrrolidone (PVP), polyoxazoline, polyethyleneglycol, polypropylene glycol, polyglycolmonoester, copolymers of polyethyleneglycol with polypropylene glycol, water-soluble cellulose derivatives, polysorbate, polyethylene-polypropylene oxide copolymers or polyethyleneimines.

In one embodiment, the blend comprises from about 20 to about 99 percent by weight polysulfone having pipeazine amine functionality and from about 1 to about 80 percent by weight of a resin, based on the weight of the blend. In another embodiment, the blend comprises from about 50 to about 97.5 percent by weight polysulfone having piperazine amine functionality and from about 2.5 to about 50 percent by weight of the resin, based on the weight of the blend. In another embodiment, the blend comprises from about 75 to about 95 percent by weight polysulfone units having piperazine amine functionality and from about 5 to about 25 percent by weight of the resin, based on the weight of the blend.

In one embodiment, the resin is PVP. PVP is a polymer that easily dissolves in water and can be eluted with water or blood from a membrane, such as a hollow fiber membrane. Crosslinking can insolubilize PVP. When PVP is completely insolubilized, it will not elute from a membrane, but will also diminish hydrophilic properties in the membrane. In one embodiment, a portion of PVP is insolubilized by crosslinking. In another embodiment, from about 5 to about 50 percent by weight of the PVP is crosslinked. In this range, the elution of the PVP is inhibited, while the blend maintains hydrophilic properties.

PVP may be crosslinked by known methods. U.S. Pat. Nos. 6,432,309 and 5,543,465, incorporated herein by reference, disclose methods for crosslinking PVP. Some exemplary methods of crosslinking include, but are not limited to, exposing it to heat, radiation, such as X-rays, alpha rays, beta rays, gamma rays, ultraviolet rays, visible radiation, infrared radiation, electron beams, or by chemical methods such as, but not limited to, treating PVP with a crosslinker, such as potassium peroxodisulfate or ammonium peroxopersulfate, at temperatures ranging from about 20° C. to about 80° C. in an aqueous medium at pH ranges from about 4 to about 9, and for a time period ranging from about 5 minutes to about 60 minutes.

PVP may be obtained by polymerizing an N-vinylpyrrolidone using standard addition polymerization techniques. One polymerization procedure involves the free radical polymerization using initiators, such as azobisisobutyronitrile (AIBN), optionally, in the presence of a solvent. PVP is also commercially available under the tradenames PLASDONE® from ISP COMPANY or KOLLIDON® from BASF.

In another embodiment, a method for making a blend comprises mixing a polysulfone units having piperazine amine functionality and one or more resins, wherein the polysulfone units having piperazine amine functionality and used as a precursor to a zwitterionic polysulfone comprises units from at least one of structure I or structure II:

wherein $R^3$ and $R^4$ are each, independently, hydrogen, $C_1$-$C_{12}$ alkyl, $C_3$-$C_{30}$ aryl, or a combination thereof;

Y is hydrogen, $C_1$-$C_{20}$ alkyl or $C_3$-$C_{30}$ aryl;

k is 0 to about 10;

a is 1 to 3;

a' is 1 to 4;

b is 1 to 4; and m and n are each, independently, 0 or 1.

In one embodiment, the blend comprising polysulfone units having piperazine amine functionality and one or more resins is reacted with sultone at elevated to generate a zwitterion containing polysulfones.

In one embodiment, a membrane is formed from a polysulfone having zwitterionic functionally and comprising units from at least one of structure VI structure VII:

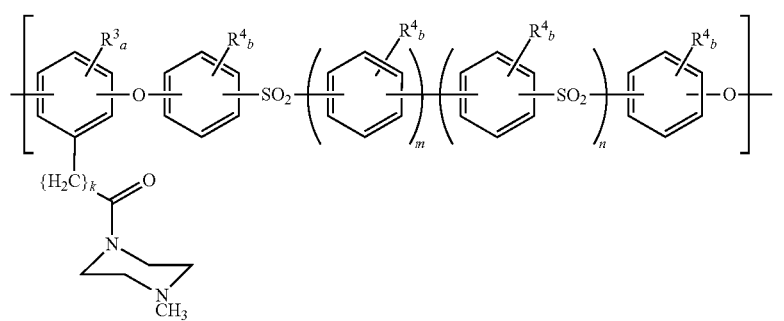

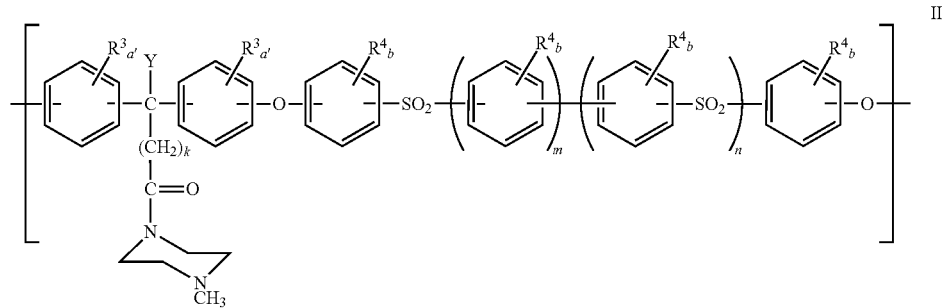

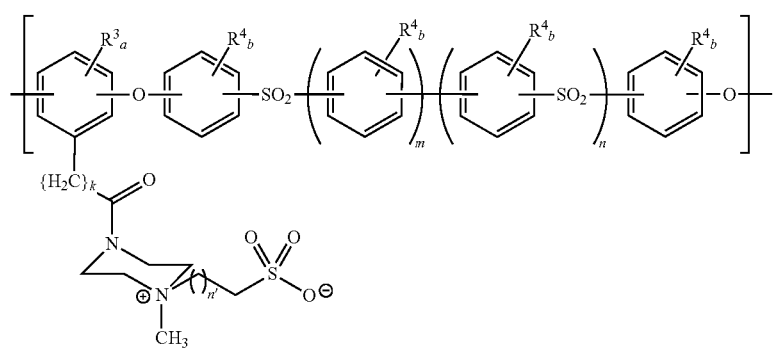

VI

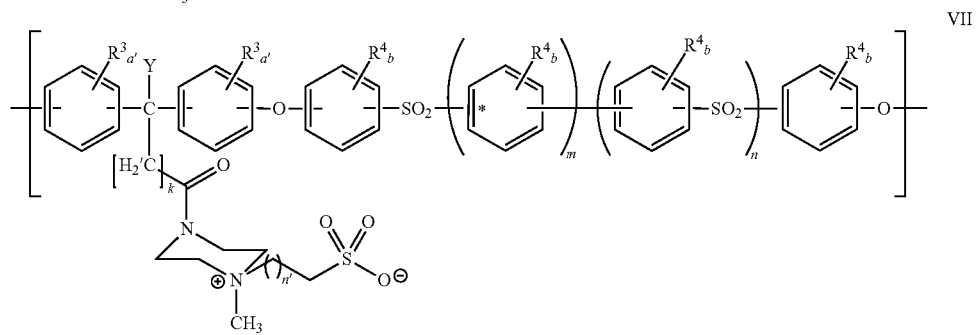

VII wherein $R^3$ and $R^4$ are each, independently at each occurrence, hydrogen, $C_1$-$C_{12}$ alkyl, $C_3$-$C_{30}$ aryl, or a combination thereof;

Y is hydrogen, $C_1$-$C_{20}$ alkyl or $C_3$-$C_{30}$ aryl;
k is from 0 to about 10;
a is 1 to 3;
a' is 1 to 4;
b is 1 to 4;
m and n are each, independently, 0 or 1; and
n' is 0 to 6.

In one embodiment, k is in a range of from 0 to about 5. In another embodiment, k is in a range of from about 1 to about 3.

In one embodiment, Y may be methyl, ethyl, propyl, isopropyl, butyl, hexyl, heptyl, octyl, 4-methylpent-1-yl, phenyl, naphthyl or biphenyl.

In one embodiment, a membrane is formed from a polysulfone having zwitterionic functionally and comprising units from at least one of structure comprises units of structure VIII:

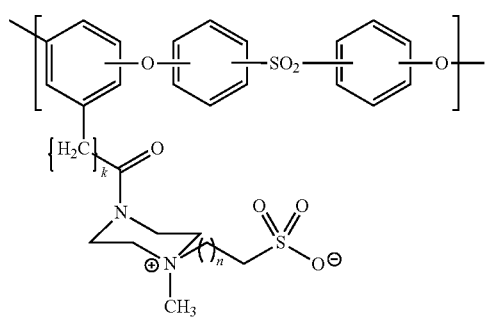

VIII wherein n is from 0 to about 10.

In one embodiment, k is in a range of from 0 to about 5. In another embodiment, k is in a range of from about 1 to about 3.

The membrane may be formed by processes which include but are not limited to, dry-phase separation membrane formation process in which a dissolved polymer is precipitated by evaporation of a sufficient amount of solvent to form a membrane structure; wet-phase separation membrane formation process in which a dissolved polymer is precipitated by immersion in a non-solvent bath to form a membrane structure; dry-wet phase separation membrane formation process, which is a combination of the dry and the wet-phase formation processes; thermally-induced phase-separation membrane formation process in which a dissolved polymer is precipitated or coagulated by controlled cooling to form a membrane structure. After the formation of a membrane, it may be subjected to a membrane conditioning process or a pretreatment process prior to its use in a separation application. Representative processes may include thermal annealing to relieve stresses or pre-equilibration in a solution similar to the feed stream the membrane will contact.

In one embodiment, the membranes may be prepared by phase inversion. The phase inversion process includes 1) vapor-induced phase separation (VIPS), also called "dry casting" or "air casting"; 2) liquid-induced phase separation (LIPS), mostly referred to as "immersion casting" or "wet casting"; and 3) thermally induced phase separation (TIPS), frequently called "melt casting". The phase inversion process can produce integrally skinned asymmetric membranes. Alternatively, the porous polyarylether having amide functionality can be used as a support for a thin film membrane ideally cast or interfacially polymerized onto its surface.

For the phase inversion process, the polysulfone having zwitterionic functionally may be dissolved in a solvent or mixture of solvents and antisolvents such that the polymer remains soluble in the mixture. In one embodiment, the solvent may be a polar aprotic solvent may be N,N-dimethylformamide, N,N-dimethylacetamide or 1-methyl-2-pyrrolidinone. In one embodiment, the antisolvent compounds may be water, alcohols, such as methanol, ethanol, isopropanol or diethylene glycol, or ketones, such as acetone, methylethylketone or isobutyl ketone. Both the polar aprotic solvent and antisolvent may be used as binary or ternary systems in combination with other solvents, antisolvents or additional polymers, such as hydrophilic polymers (e.g., polyvinylpyrollidinone or polyethylene glycol), which effect the morphology of the phase inverted membrane. The morphology can be dictated by the type, amount and molecular weight of the polysulfone having zwitterionic functionally and other polymers incorporated into a blend if so formulated.

The membranes may be crosslinked to provide additional support. The membranes may be crosslinked by incorporating a hollow fiber membrane into a module, filled with an aqueous solution in which 100 to 1,000 ppm of sodium disulfite and 50 to 500 ppm sodium carbonate are dissolved, and irradiated with gamma rays. The dose of gamma rays is set appropriately taking the objective degree of cross-linking into consideration. In one embodiment, a dose of gamma rays is in the range of about 10 kGy to about 100 kGy.

The membrane may be a hollow fiber or in a flat sheet or in a nanofiber mat configuration. The membrane may be fabricated into symmetric or asymmetric configurations.

The membrane may be designed to have specific pore sizes so that solutes having sizes greater than the pore sizes may not be able to pass through. A pore size refers to the radius of the pores in the active layer of the membrane. In one embodiment, the pore size ranges from about 0.5 to about 100 nm. In another embodiment, the pore size ranges from about 4 to about 50 nm. In another embodiment, the pore size ranges from about 4 to about 25 nm. In another embodiment, the pore size ranges from about 4 to about 15 nm. In another embodiment, the pore size ranges from about 5.5 to about 9.5 nm.

The membranes may be used for filtering aqueous media, such as hemodialysis, water separation, biopharmaceuticals separation, virus filtration and chemical separations. The membranes or membrane-like structures may also be used for gas separation and scaffolds for tissue engineering or cell culturing. In one embodiment, architectures made from these materials may mimic the structure of bone marrow and facilitate proliferation and differentiation of stem cells into specific blood cells.

In another embodiment, the membranes are water separation membranes and may be used for desalinating brackish and sea water, water softening, production of ultra pure water for electronics and pharmaceutical industries and industrial wastewater purification for food and beverage, electroplating and metal finishing, textiles and laundry, petroleum and petrochemical, and pulp and water industries In one embodiment, the membranes are hemodialysis or hemofiltration membranes. Hemodialysis and hemofiltration membranes are porous membranes permitting the passage of low molecular weight solutes, such as urea, creatinine, uric acid, electrolytes and water, while preventing the passage of higher molecular weight proteins and blood cellular elements.

In one embodiment, a hemodialysis membrane comprises polysulfone having zwitterionic functionally and comprising In order that those skilled in the art will be better able to practice the present disclosure, the following examples are given by way of illustration and not by way of limitation.

EXAMPLES

Example I

Synthesis of Monomers: Diphenolic Acid Methyl Ester

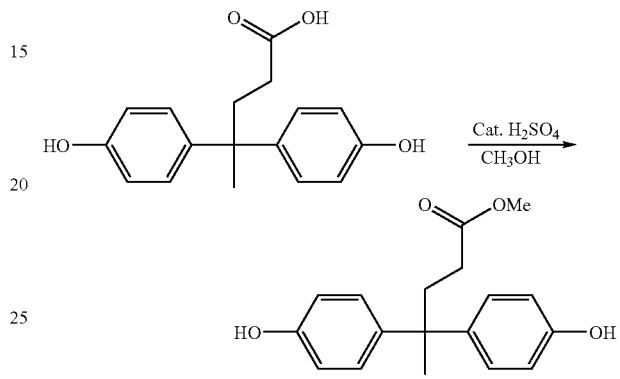

Diphenolic acid (500 g) and methanol (1 liter) was charged into a three-neck flask equipped with nitrogen inlet, mechanical stir, and condenser. To this solution was added concentrated $H_2SO_4$ (18 ml). The solution was heated at 78° C. for 24 hours. The solution was collected and evaporated in vacuo. The solid was collected, and washed with excess of water. The solid was dried in vacuo to afford 502 g (96% yield) of the monomer.

Example II

Synthesis of Monomers: Diphenolic Acid Piperizine Amide

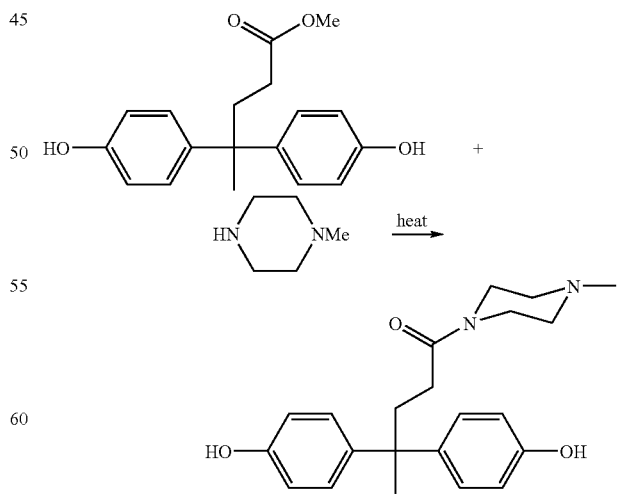

A mixture of diphenolic acid methyl ester (20 g) and N-methylpiperazine (20 g) was heated to 185° C. for 7 hour, until NMR showed 100% conversion of the starting material. The solution was cooled to 100° C. To this solution was added acetone (67 ml) and water (27 ml). The solution was evaporated at 110° C., until a large amount of white powder forms. The solution was cooled to room temperature, and 40 ml of 15% aqueous acetone solution was added. The white solid was filtered, and dried in vacuo to afford the amide (20.8 g, 85% yield).

Example III

Synthesis of Polymers with Diphenolic Acid Piperazine Amide, BPA, and Dichlorodiphenylsulfone ferred into a three-neck flask equipped with a Dean-Stark trap, nitrogen inlet, and mechanical stirrer. DMSO (6 ml), and toluene were added. The mixture was stirred at 165° C. The water generated was removed. After 2 hours, the reaction mixture was cooled, before dichlorodiphenylsulfone (2.872 g, 10 mmol) was added. The reaction mixture was stirred at 180° C., until a very viscous solution was obtained. The reaction mixture was diluted with DMAC, and precipitated in water. The polymer, isolated by vacuum filtration, was washed with water and methanol respectively, and dried in vacuo at 70° C.

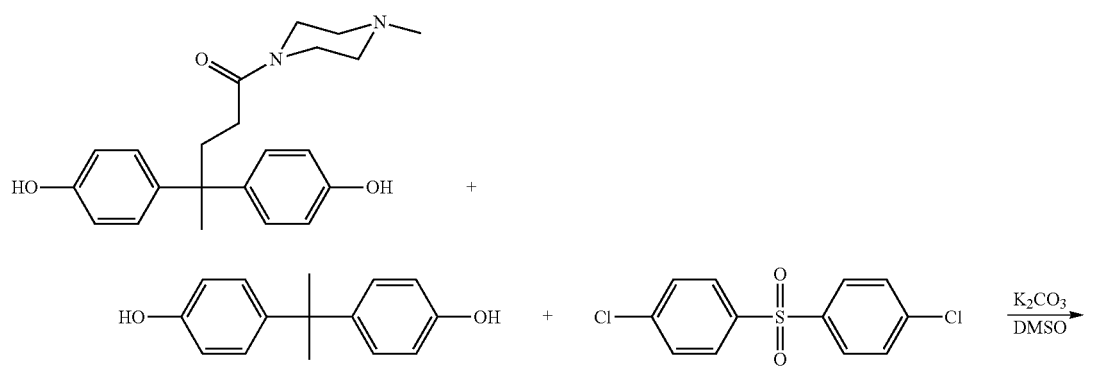

Diphenolic acid piperazine amide (2.211 g, 6 mmol), BPA (1.37 g, 6 mmol), and potassium carbonate (18.0 mmol, 2.49 g) were transferred into a three-neck flask equipped with a Dean-Stark trap, nitrogen inlet, and mechanical stirrer. DMSO (6 ml), and toluene were added. The mixture was stirred at 165° C. The water generated was removed. After 2 hours, the reaction mixture was cooled, before dichlorodiphenylsulfone (3.446 g, 12 mmol) was added. The reaction mixture was stirred at 180° C., until a very viscous solution was obtained. The reaction mixture was diluted with DMAC, and precipitated in water. The polymer, isolated by vacuum filtration, was washed with water and methanol respectively, and dried in vacuo at 70° C.

Example IV

Synthesis of Polymers with Diphenolic Acid Piperazine Amide and Dichlorodiphenylsulfone Diphenolic acid piperazine amide (3.685 g, 10.0 mmol) and potassium carbonate (15.0 mmol, 2.07 g) were trans-

Example V

Synthesis of Polymers with Diphenolic Acid Piperazine Amide, BPA and Dichlorodiphenylsulfone Diphenolic acid piperazine amide (2.764 g, 7.5 mmol), BPA (0.571 g, 2.5 mmol), and potassium carbonate (15.0 mmol, 2.07 g) were transferred into a three-neck flask equipped with a Dean-Stark trap, nitrogen inlet, and mechanical stirrer. DMSO (6 ml), and toluene were added. The mixture was stirred at 165° C. The water generated was removed. After 2 hours, the reaction mixture was cooled, before dichlorodiphenylsulfone (2.872 g, 10 mmol) was added. The reaction mixture was stirred at 180° C., until a very viscous solution was obtained. The reaction mixture was diluted with DMAC, and precipitated in water. The polymer, isolated by vacuum filtration, was washed with water and methanol respectively, and dried in vacuo at 70° C.

Example VI

Synthesis of Zwitterion Containing Polysulfones

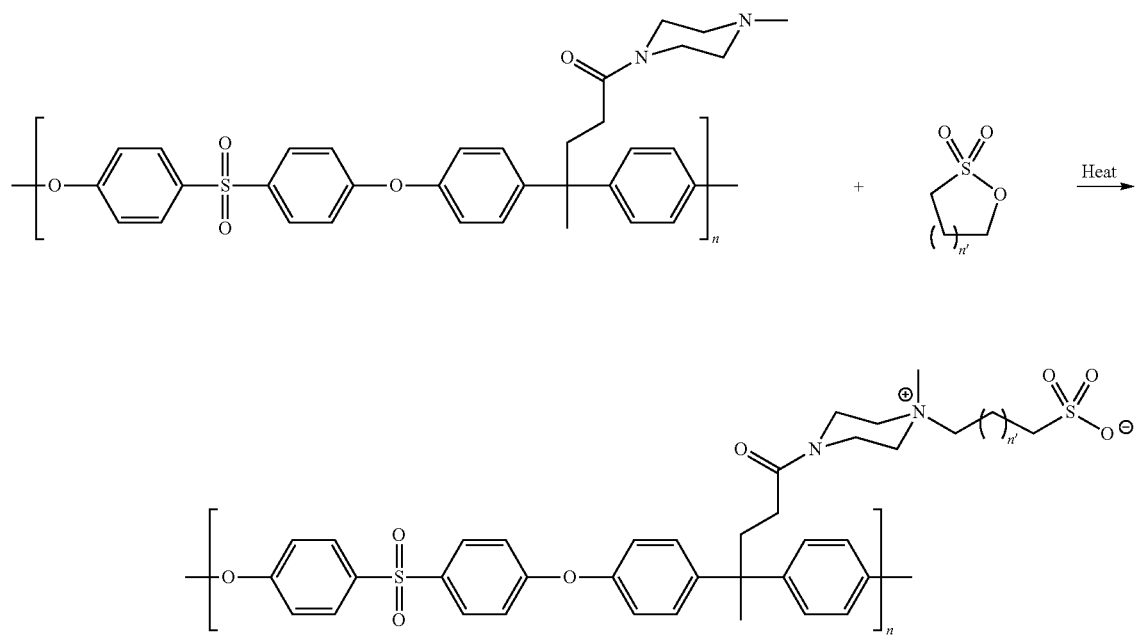

Piperazine amide containing polysulfone (300 mg, 0.51 mmol) and 1,3-propane sultone (63 mg, 0.51 mmol) was dissolved in 0.9 ml of DMAC. The clear solution was heated to 80° C. to afford a solid. The solid was broken apart in a blender. The power was filtered, and dried in vacuo.

Example VII

Surface Treatment

A glass vial was filled with 5% polymer (described in Example 6 above) solution, and dried in vacuo to afford a homogeneous coating on the inner surface of the vial. 2% IPA (or acetone or water) solution of propane solution was added to the coated vial. The solution was heated to 65° C. for 2 hours, before it was washed excessively with DI water. The surface of the coating is covered with Zwitterionic species.

The invention claimed is:

1. A membrane comprising a reaction product of a piperazine amine functionalized polysulfone and a sultone wherein said reaction product has zwitterionic functionality and comprises structural units VI or VII:

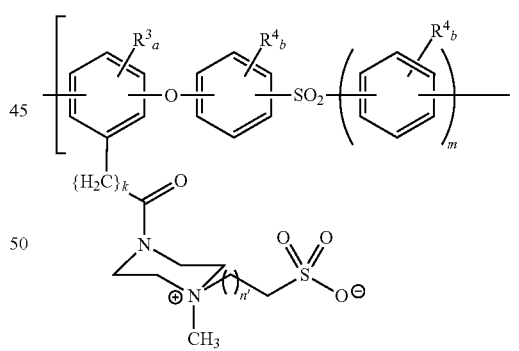

VI

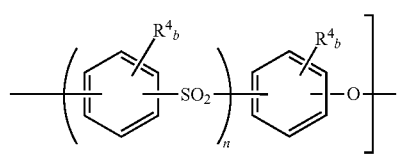

-continued

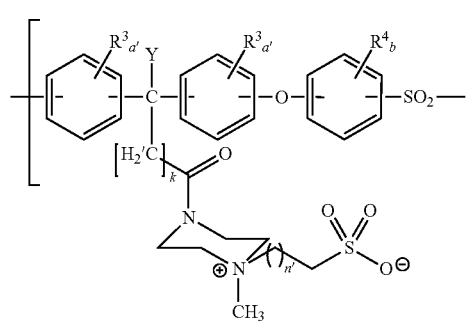

VII

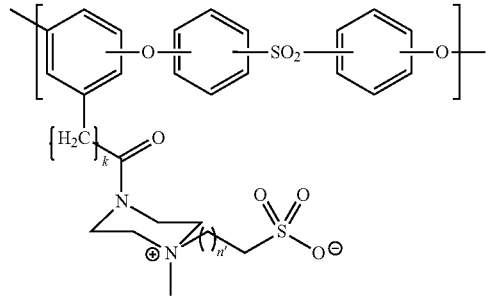

wherein $R^3$ and $R^4$ are hydrogen;
k is from 0 to about 10;
a is 3;
b is 4
m and n are 0; and
n' is 0 to 6.

3. The membrane of claim 1 wherein the reaction product having zwitterionic functionality is a copolymer.

4. The membrane of claim 1 wherein the membrane comprises a blend of the reaction product having zwitterionic functionality with at least one other polymer or oligomer.

5. The membrane of claim 4 wherein the at least one other polymer or oligomer is a polysulfone, a polyether sulfone, a polyether urethane, a polyphenylene sulfone, a polyamide, a polyether-amide, a polyacrylonitrile, a polyvinylpyrrolidone (PVP), a polyoxazoline, a polyethyleneglycol, a polypropylene glycol, a polyglycolmonoester, a copolymer of polyethyleneglycol with polypropylene glycol, a water-soluble cellulose derivative, a polysorbate, a polyethylene-polypropylene oxide copolymer, or a polyethyleneimine.

6. The membrane of claim 5 wherein the at least one other polymer or oligomer is polyvinylpyrrolidone (PVP).

7. The membrane of claim 5 wherein the polyether sulfone comprises structural units IX or X:

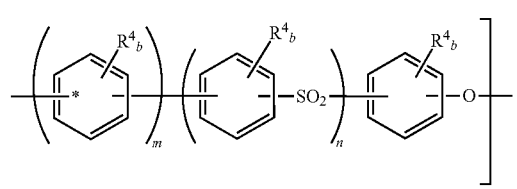

wherein $R^3$ and $R^4$ are each, independently at each occurrence, hydrogen, $C_1$-$C_{12}$ alkyl, $C_3$-$C_{30}$ aryl, or a combination thereof;
k is from 0 to about 10;
Y is hydrogen, $C_1$-$C_{20}$ alkyl or $C_3$-$C_{30}$ aryl;
a is 1 to 3;
a' is 1 to 4;
b is 1 to 4;
m and n are each, independently, 0 or 1; and
n' is 0 to 6.

2. The membrane of claim 1 wherein the reaction product comprises structural units VI,

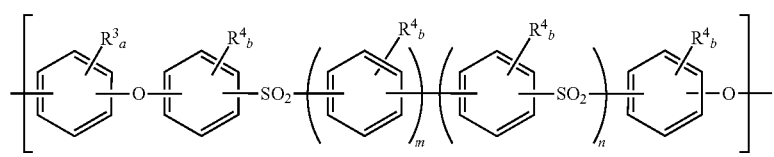

IX

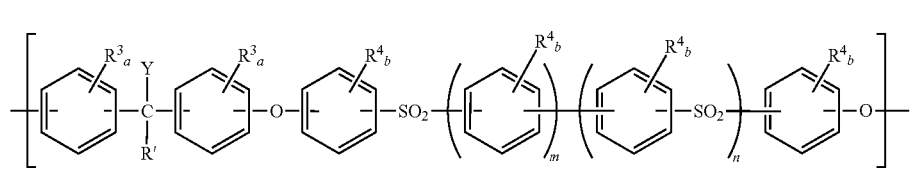

X wherein $R^3$ and $R^4$ are each, independently at each occurrence, hydrogen, $C_1$-$C_{12}$ alkyl, $C_3$-$C_{30}$ aryl, or a combination thereof;

Y and R' are each, independently at each occurrence, hydrogen, $C_1$-$C_{20}$ alkyl, or $C_3$-$C_{30}$ aryl;

a, is 1 to 4;

b is 1 to 4; and m and n are each, independently 0 or 1.

8. A method for hemodialysis and hemofiltration, said method comprising contacting blood with a membrane of claim 1.

9. A method of water purification, said method comprising contacting a water stream with a membrane of claim 1.

* * * * *